(12) United States Patent
Freeman

(10) Patent No.: US 6,608,720 B1
(45) Date of Patent: *Aug. 19, 2003

(54) OPTICAL INSTRUMENT AND OPTICAL ELEMENT THEREOF

(76) Inventor: Robin John Freeman, Aquarius, The Fairway, Worplesdon, Surrey (GB), GU3 3QE ( * ) Notice: Subject to any disclaimer, the term of this patent is extended or adjusted under 35 U.S.C. 154(b) by 0 days.

This patent is subject to a terminal disclaimer.

(21) Appl. No.: 09/324,104

(22) Filed: Jun. 2, 1999

Related U.S. Application Data

(63) Continuation-in-part of application No. 08/867,353, filed on Jun. 2, 1997, now Pat. No. 6,028,704.

(51) Int. Cl.⁷ .............................. G02B 5/18; G02B 21/00
(52) U.S. Cl. ..................... 359/569; 359/566; 359/576; 359/368
(58) Field of Search ................................. 359/565, 566, 359/569, 576, 368, 372–374, 599; 353/122; 345/8

(56) References Cited

U.S. PATENT DOCUMENTS

| | | |
|---|---|---|
| 3,040,626 A | 6/1962 | Griffioen |
| 3,585,286 A * | 6/1971 | Macovski .................... 359/576 |
| RE29,091 E | 12/1976 | De Palma et al. |
| 4,099,831 A | 7/1978 | Freeman |
| 4,217,025 A | 8/1980 | Takenaka |
| 4,225,215 A | 9/1980 | Cojan |
| 4,390,239 A | 6/1983 | Huber |
| 4,695,135 A | 9/1987 | Der Exter Blokland et al. |
| 4,717,823 A | 1/1988 | Steimel et al. |
| 4,798,451 A | 1/1989 | Fujiwara |
| 4,878,735 A | 11/1989 | Vilums |
| 4,927,262 A | 5/1990 | Schwartz |
| 5,124,843 A | 6/1992 | Leger et al. |
| 5,446,588 A | 8/1995 | Missig et al. |
| 5,644,323 A | 7/1997 | Hildebrand et al. |
| 5,661,603 A | 8/1997 | Hanano et al. |
| 5,701,132 A | 12/1997 | Kollin et al. |
| 5,742,262 A | 4/1998 | Tabata et al. |
| 5,829,858 A * | 11/1998 | Levis et al. .................. 353/122 |
| 6,028,704 A * | 2/2000 | Freeman ..................... 359/565 |

FOREIGN PATENT DOCUMENTS

| | | |
|---|---|---|
| DD | 210 131 | 6/1984 |
| EP | 0 463 888 A2 | 7/1991 |
| FR | 2 217 718 | 6/1974 |
| GB | 1 275 917 | 6/1972 |
| GB | 1 586 701 | 3/1981 |
| JP | 8-166556 | 6/1996 |
| WO | 94/27177 | 11/1994 |
| WO | 97/37339 | 10/1997 |

OTHER PUBLICATIONS

International Search Report.

* cited by examiner

*Primary Examiner*—Audrey Chang
(74) *Attorney, Agent, or Firm*—Shoemaker and Mattare

(57) ABSTRACT

An optical instrument is described in which a diffractive element is located at a focal or image plane of the instrument and the diffractive element is effective to produce an array of a plurality of exit pupils at a viewing position for the instrument and thereby to form an enlarged exit pupil for the instrument. The diffractive element is formed to provide a plurality greater than two of optical diffractive gratings each being disposed angularly relative to others of the plurality of optical diffractive gratings.

23 Claims, 8 Drawing Sheets

OPTICAL INSTRUMENT AND OPTICAL ELEMENT THEREOF

CROSS REFERENCES TO RELATED APPLICATIONS

This is a continuation in part of application Ser. No. 08/867,353 filed Jun. 2, 1997 now U.S. Pat. No. 6,028,704.

BACKGROUND OF THE INVENTION

This invention relates to optical instruments and in particular to optical instruments having an exit pupil at which an image of an object may be viewed by an observer.

In conventional optical instruments the size of the exit pupil is determined by a function of the numerical aperture of the instrument and the overall magnification of the instrument and hence the size of the exit pupil is of fixed and relatively small dimension. Consequently it is necessary for an observer to accurately align the entrance pupil of his eye with the exit pupil of the optical instrument in order properly to view an image or otherwise receive light from the instrument.

In my pending European patent application No. 94905777.2 I have described and claimed optical apparatus provided with an enlarged exit pupil whereby an observer is able to enjoy the freedom to receive images or light from the optical apparatus by placing his eye pupil anywhere within an enlarged exit pupil. The enlarged exit pupil is obtained by the provision of a diffractive element located at an intermediate focal or image plane of the optical instrument. The diffractive element comprises a substrate having a plurality of parallel first grooves in a surface of the substrate, edges of the first grooves being coincident and forming lines of a first diffractive grating and a plurality of parallel second grooves in the surface of the substrate, the second grooves extending perpendicular to the first grooves and edges of the second grooves being coincident and forming lines of a second diffractive grating. While a construction of diffractive element as described in my pending European patent application No. 94905777.2 produces an enlarged exit pupil, my present invention provides an improved optical instrument having an enlarged exit pupil.

SUMMARY OF THE INVENTION

According to one aspect of the invention an optical includes means to produce an optical image to be viewed at an exit pupil by an observer; means to produce an enlarged exit pupil comprising an array of a plurality of said exit pupils; said means to produce the array of exit pupils comprising a diffractive element located at an intermediate focal or image plane of the optical instrument; said diffractive element including substrate bearing a plurality greater than two of optical diffractive gratings, each said optical diffractive gratings comprising a set of parallel diffraction lines defined by a set of parallel grooves in a surface of said substrate; the parallel diffraction lines of each diffractive optical grating of the plurality of optical diffractive gratings extending angularly relative to the diffraction lines of other optical diffractive gratings of the plurality of optical diffractive gratings.

According to a second aspect of the invention a diffractive element of an optical instrument includes a substrate; a surface on said substrate; a plurality greater than two of optical diffractive gratings; said optical diffractive gratings each comprising a set of parallel diffraction lines defined by a set of parallel grooves in said surface of said substrate; the parallel diffraction lines of each diffractive optical grating of the plurality of optical diffractive gratings extending angularly relative to the diffraction lines of other optical diffractive gratings of the plurality of optical diffractive gratings.

BRIEF DESCRIPTION OF THE DRAWING

An embodiment of the invention will now be described by way of example with reference to the drawings in which.

DESCRIPTION OF THE PREFERRED EMBODIMENT

Figure 1:
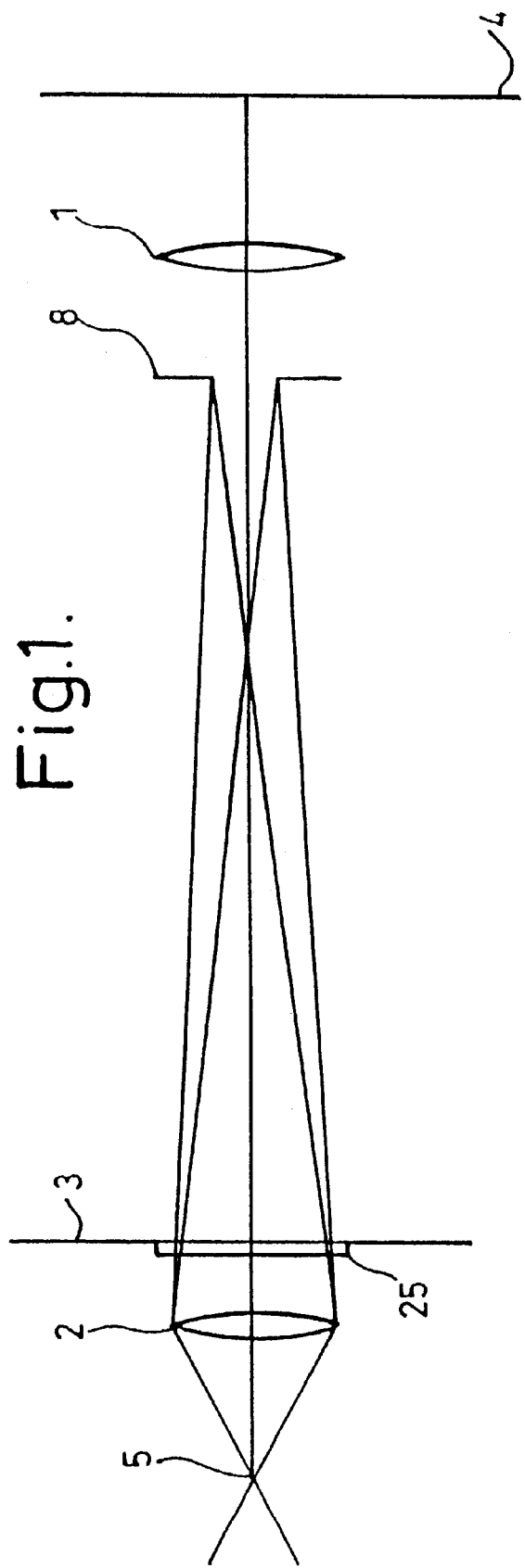
FIG. 1 shows optical elements of a microscope incorporating a diffractive element.
Figure 2:
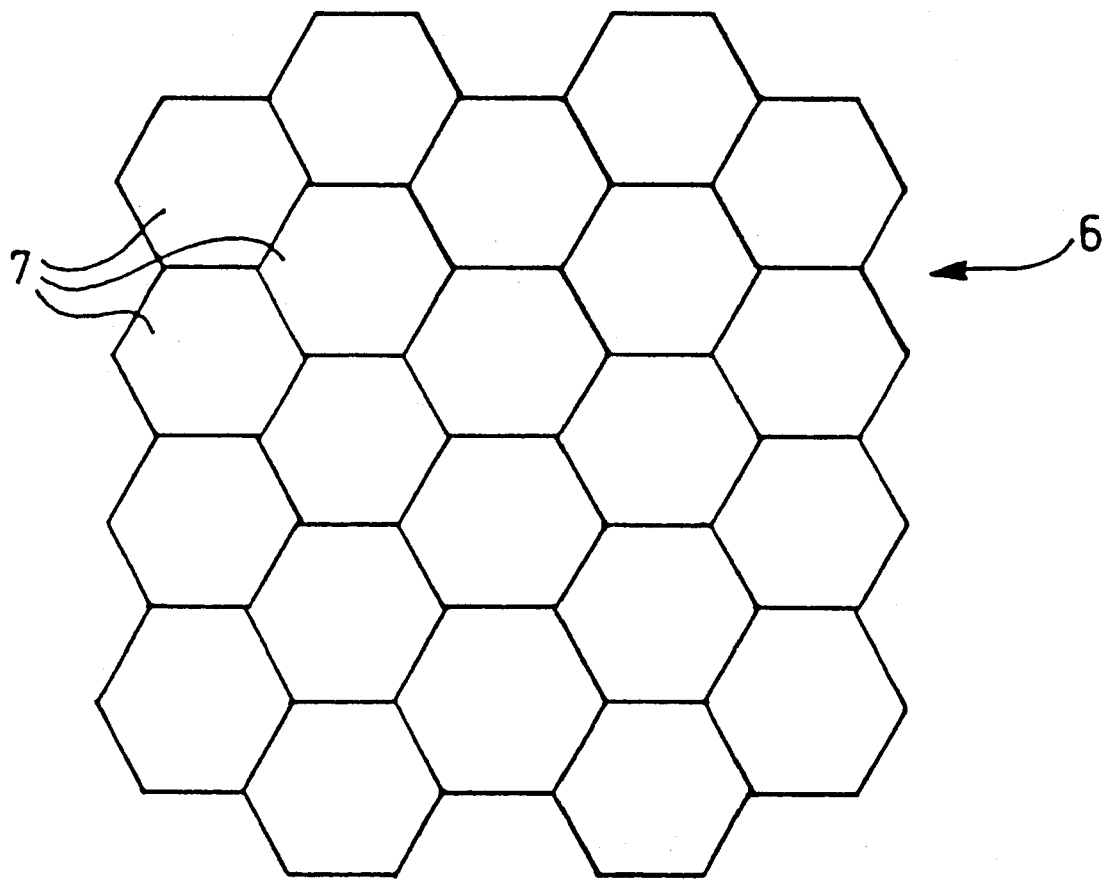
FIG. 2 is a representation of an array of exit pupils produced in the microscope of FIG. 1.

Referring first to FIG. 1, a microscope includes an objective lens 1 and an eyepiece 2. The objective lens produces an intermediate image in a focal or image plane 3 of an object in an object plane 4 and, as is well known, when an eye of an observer is aligned with an exit pupil 5 of the microscope a magnified image of the intermediate image and hence of the object may be observed. The exit pupil 5 is an image of the aperture of the objective lens 1. In the microscope in accordance with the invention a transmissive diffractive element 25 is located at the intermediate focal or image plane 3 of the microscope. The diffractive element 25 is effective to cause the microscope to produce an array 6 (FIG. 2) of exit pupils 7 each corresponding to the exit pupil 5 which would be formed in the absence of the diffractive element 25. By suitable choice of design of the diffractive element 25 the array of exit pupils 6 may be such that adjacent exit pupils 7 are contiguous or overlapping. It is to be understood that the representation of the array of exit pupils in FIG. 2 is for the purpose of explanation and that while the exit pupils of the array may be of hexagonal shape as illustrated, the exit pupils may be of other shape or form.

If desired the aperture of the object lens may be defined by an aperture stop 8. The aperture stop 8 may be circular and the exit pupil will then also be circular. However the aperture may be of a shape which is not circular and for example may be rectangular, square or hexagonal. Accordingly the exit pupils 5, 7 are produced with a corresponding shape which may, if desired, be such that the exit pupils of the array can be located contiguous to one another with no gaps therebetween or the exit pupils overlap one another.

However it will be appreciated that the location of the exit pupils relative to one another is chosen such that the array of exit pupils appears to the eye of an observer as a single continuous enlarged exit pupil.

Figure 3:
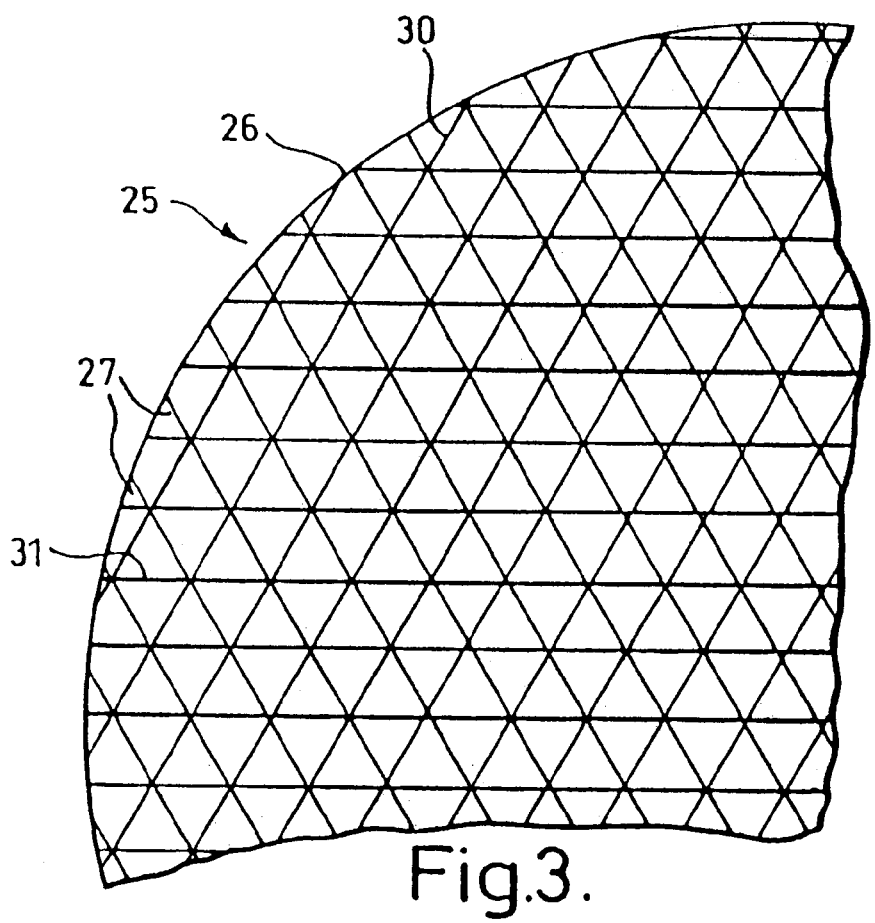
FIG. 3 shows a diffractive optical element provided with three optical diffractive gratings.
Figure 4:
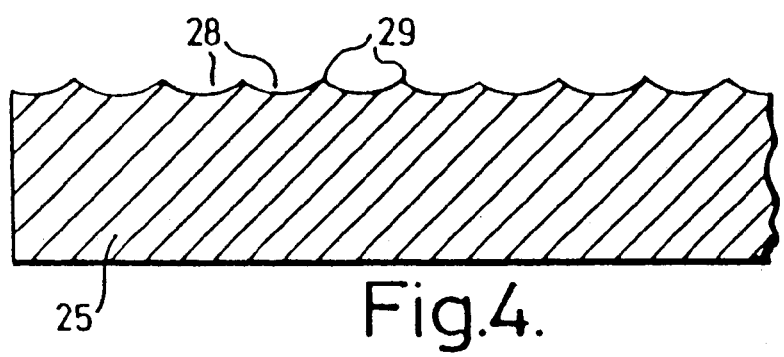
FIG. 4 is a view illustrating a profile of grooves forming the optical diffractive gratings.
Figure 5:
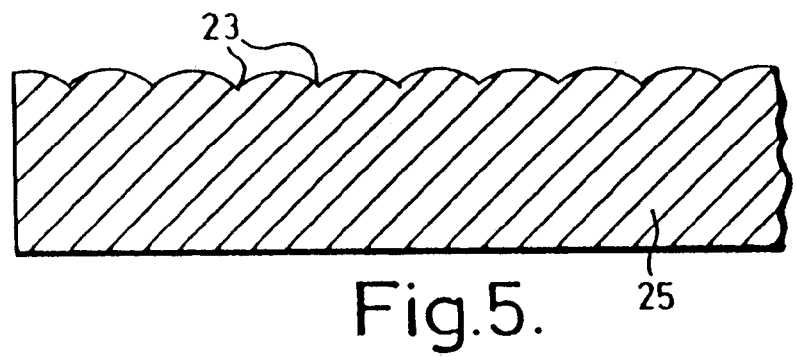
FIG. 5 is a view similar to FIG. 6 but illustrating an alternative form of grooves forming the optical diffractive gratings.

The diffractive element 25 has a surface 26 on which a plurality greater than two of optical diffractive gratings are formed. In FIG. 3 the diffractive element is shown as having three optical diffractive gratings. The diffraction element 25 has a plurality of sets of parallel grooves in the surface 26 thereof, each set of parallel grooves defines diffraction lines of a respective diffractive optical grating. A first set of parallel first grooves in the surface 26 define parallel diffraction lines 27 of a first diffractive grating, second parallel grooves define parallel diffraction lines 30 of a second diffractive optical grating and third parallel grooves define parallel diffraction lines 31 of a third diffractive optical grating. The first, second and third grooves extend angularly relative to one another so that the diffraction lines of the three optical diffraction gratings respectively extend angularly relative to one another and, for example as shown in FIG. 5, extend equi-angularly at 60° relative to each other. The grooves have walls 28 which may have a profile as illustrated in FIG. 4. The spacing, i.e. the pitch, of the diffraction lines of the optical diffractive gratings determines the spacing of the exit pupils in the array of exit pupils. Typically the pitch of the diffraction lines of the optical diffractive gratings may be in the range of 2–160 microns. The angle and form of the wall 28 of the grooves determine the dispersion of light to the plurality of exit pupils and the wall of the grooves is formed such as to produce a substantially uniform dispersion of light to the plurality of exit pupils. Instead of forming grooves 28 in the surface 26 such that common edges 29 forming a diffractive optical grating lie uppermost at the surface with the grooves forming troughs between the edges as shown in FIG. 4, the element 25 may be formed with an inverse formation such that diffraction lines 23 of the optical diffractive gratings are defined by deepest parts of grooves formed in the element as shown in FIG. 5.

Figure 8:
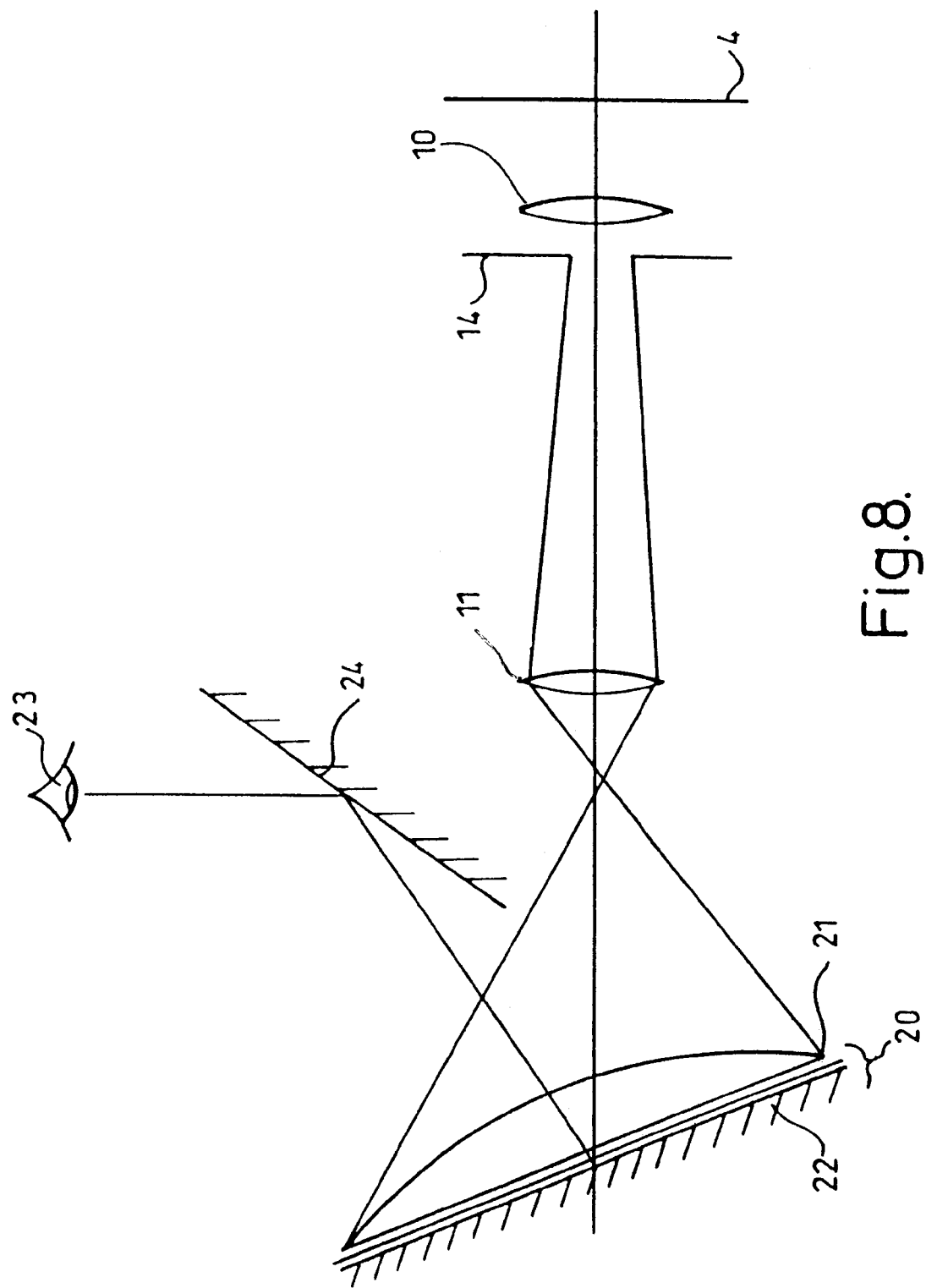
FIG. 8 shows an alternative form of projection microscope using a reflective diffractive element.

While FIG. 3 illustrates a diffractive optical element 25 having three optical diffractive gratings extending equi-angularly relative to each other, a greater number of optical diffractive gratings may be provided on the diffractive optical element 25 if desired. For example, as illustrated in FIG. 8, six optical diffraction gratings may be provided and it is to be understood that more than six optical diffraction gratings may be provided.

Figure 6:
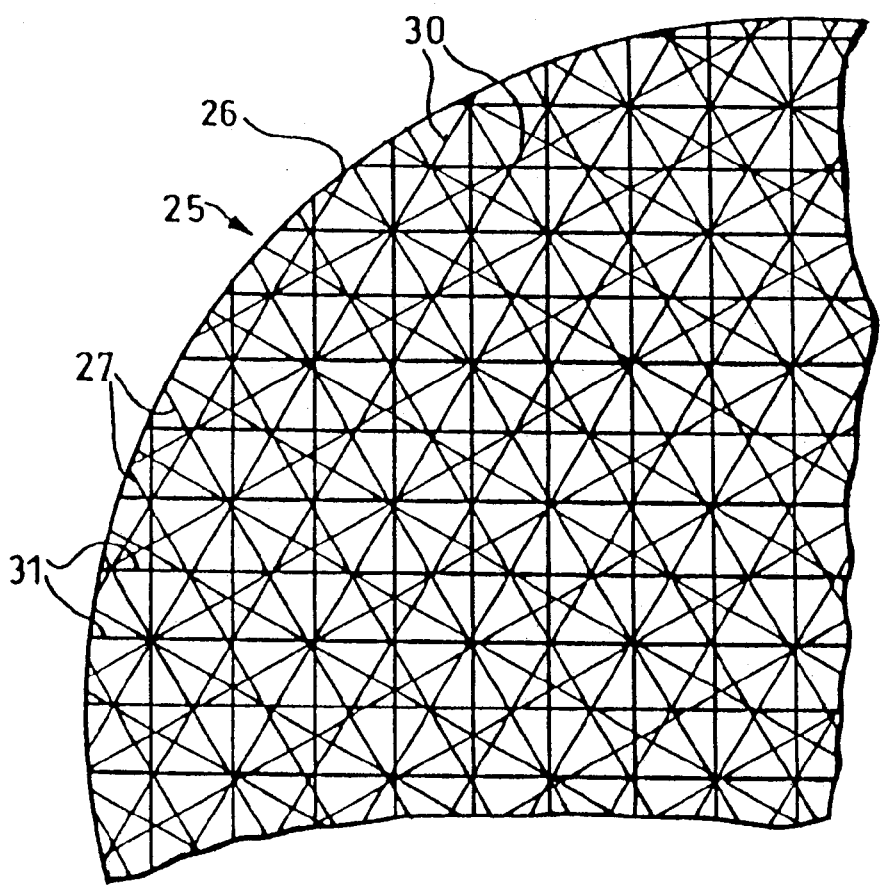
FIG. 6 shows a diffractive optical element similar to that shown in FIG. 3 but provided with six optical diffractive gratings.

The spacing of the diffraction lines of the optical diffractive gratings may be equal or not equal as desired. Also, the cross sectional form of all of the grooves of one grating may be substantially the same or, if desired, the cross sectional form of each groove or of some grooves relative to an adjacent groove may be different to provide a required distribution of light to the exit pupils. In FIG. 3 the lines of the three optical diffraction gratings are shown as extending equi-angularly and symmetrically relative to one another. Similarly in FIG. 6 the lines of the optical diffractive gratings extend symmetrically relative to one another. However it is to be understood that if desired other angular relationships between diffraction lines of the optical diffraction gratings may be chosen.

It will be appreciated that when multichromatic light comprising light of a plurality of different wavelengths is acted on by an optical diffraction grating the diffraction of the light dependent upon the wavelength of the light. When it is desired to operate a microscope and other optical instruments using multichromatic light, if only two optical diffraction gratings are provided on the diffractive element as described in my pending European patent application No.94905777.2, colour fringing effects occur and detract from the quality of the image formed by the instrument. The provision of a greater number than two of optical diffraction gratings as described hereinbefore decreases the observed colour fringing effects and enhances the image observed by the viewer.

The colour fringing effect observed by a viewer is reduced by forming the optical diffraction gratings such as to produce an array of exit pupils in which the exit pupils of the array overlap in a plurality of directions. As a result of the overlapping of the exit pupils in the array of exit pupils, the colour fringing produced by each of the optical diffraction gratings tends to cancel and thereby reduce the observed colour fringing. This overlapping of the exit pupils of the array in a plurality of directions is achieved by the provision of more than two optical diffraction gratings and for example with the diffractive element of FIG. 3 the exit pupils of the array overlap in three direction and with the diffractive element of FIG. 6 the exit pupils of the array overlap in six directions.

Other forms of optical instrument utilising a diffractive element to produce an enlarged exit pupil comprising an array of exit pupils will now be described with reference to FIGS. 7 to 10.

Figure 7:
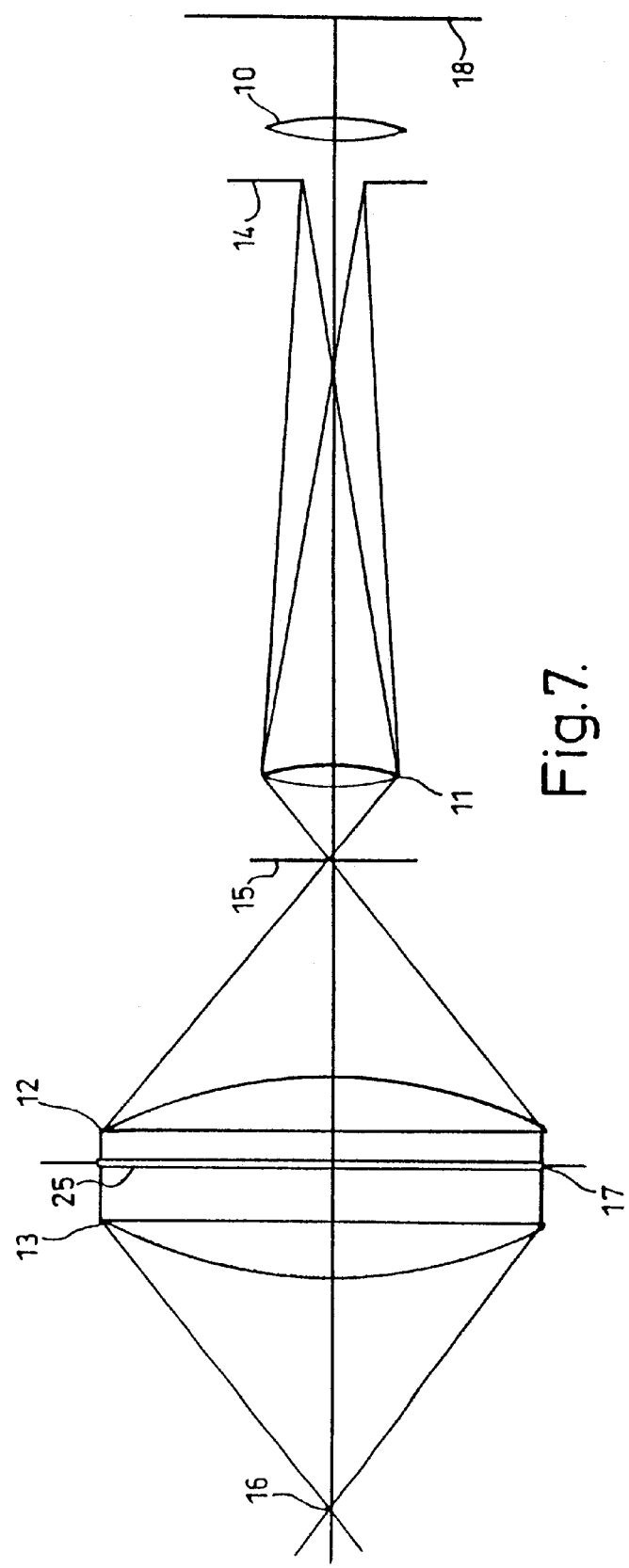
FIG. 7 shows optical elements of a projection microscope utilising a transmissive diffractive element.

FIG. 7 shows a projection microscope including an objective lens 10, a projection eyepiece 11 and field lenses 12, 13. In this construction of projection microscope the projection eyepiece images the aperture of the object lens 10 or, if provided, of an aperture stop 14 to form an intermediate exit pupil at an intermediate plane 15. The field lenses 12, 13 relay an image of the intermediate exit pupil at plane 15 to a final exit pupil 16 at a viewing position for an observer. The objective lens 10 and the projection eyepiece 11 form an image in a plane 17 intermediate the field lenses 12, 13 of an object in an object plane 18. A transmissive diffractive element 25 is located in the plane 17 to produce an array of images of the intermediate exit pupil in plane 15 such as to form an enlarged final exit pupil 16 at the viewing position.

Figure 10:
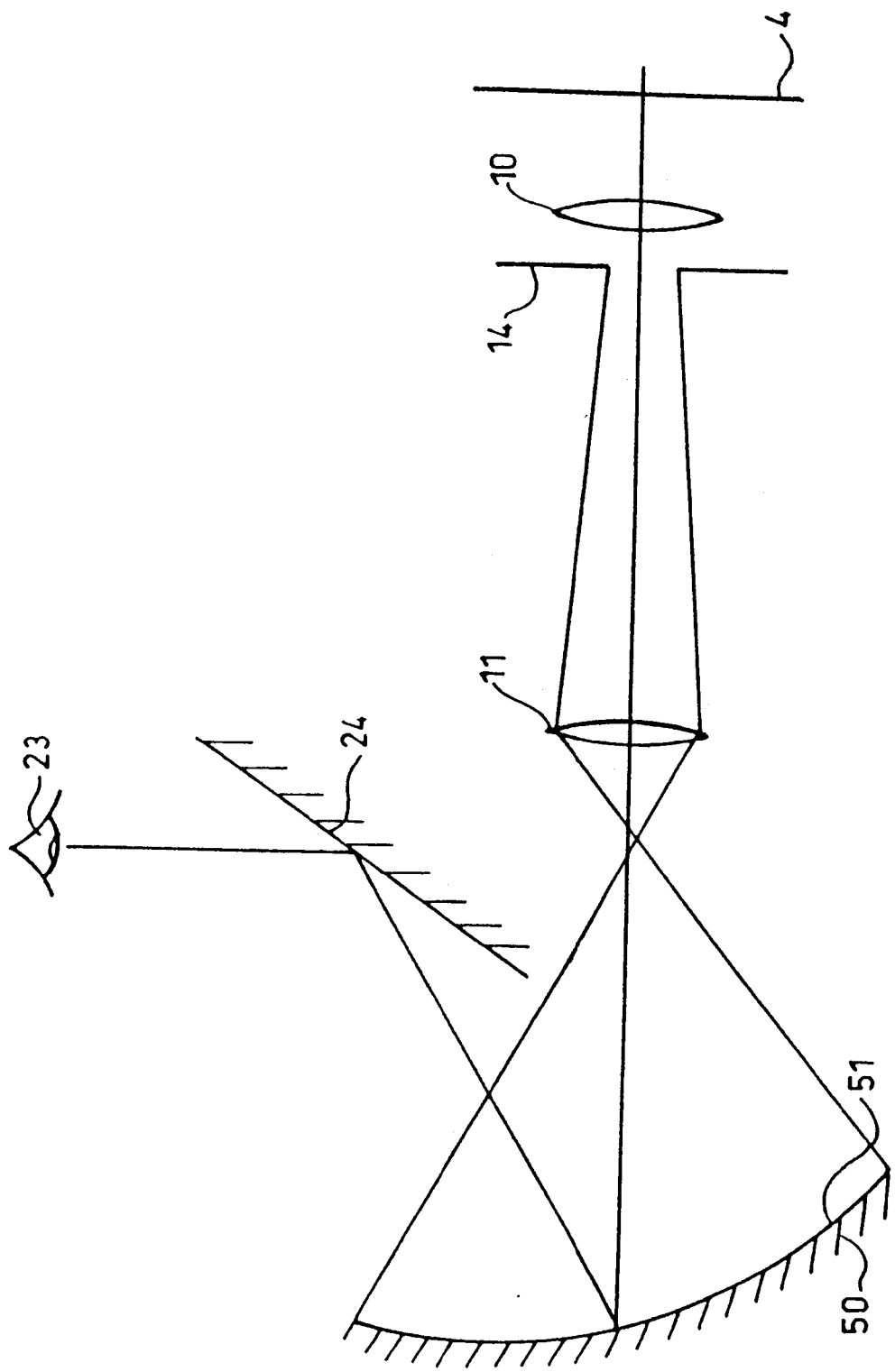
FIG. 10 shows an alternative construction of the projection microscope illustrated by FIG. 4.

FIG. 8 shows a further embodiment of projection microscope in which, instead of forming an image at a transmissive diffractive element as in the microscope shown in FIG. 1 and the projection microscope shown in FIG. 7, the image is formed at a reflective diffractive element 20. A single field lens 21 and a reflective element 22 is provided to form an image for viewing by an eye 23 of an observer via a mirror 24. A diffractive element 25 is provided adjacent the surface of the reflective element 22. The diffractive element 25 may be a separate element as illustrated in FIG. 7 or may be integral with the reflective element 22 and be formed on the reflective surface of the reflective element 22. Instead of a field lens 21 and planar mirror 22, a concave part-spherical reflective element 50 may be provided as shown in FIG. 10. The diffractive element 51 may be integral with the concave reflective element and be formed on the part-spherical concave surface of the reflective element so that the diffractive element has the form of curvature of the surface of the reflective element.

Thus it will be understood that the invention provides an optical instrument including an optical diffractive element which, when located at an intermediate image plane of the optical instrument, produces by reflective diffractive means or refractive diffractive means together with an associated field lens or mirror system, an array of exit pupils, or images of intermediate exit pupils, of the instrument at the viewing position for an eye of an observer.

In the construction of microscope illustrated in FIG. 7 in which field lenses 12, 13 are provided to project the image and in the construction of microscope illustrated in FIG. 8 in which a mirror and a field lens 21 are provided to project the image, the field lenses need to be at least as large as the image field. This presents disadvantages in respect of cost and weight of the instrument and where larger fields of view are required it becomes impractical to manufacture the size of field lenses required. In order to overcome these disadvantages Fresnel lenses may be utilised in place of the refractive field lenses. Instead of forming a conventional circular Fresnel lens the required optical characteristic of a circular Fresnel lens is provided by means of a plurality of cylindrical Fresnel lenses disposed angularly relative to each other. Each cylindrical Fresnel lens is formed as a pattern of parallel prismatic strips. The cylindrical Fresnel lenses in combination act optically as a conventional circular lens. As described hereinbefore a pattern of a plurality of sets of parallel diffraction lines is utilised to generate an array of exit pupils. The surfaces of the prismatic strips forming the Fresnel lenses are modified as compared with a conventional Fresnel lens by forming thereon the lines of optical diffractive gratings.

Figure 9:
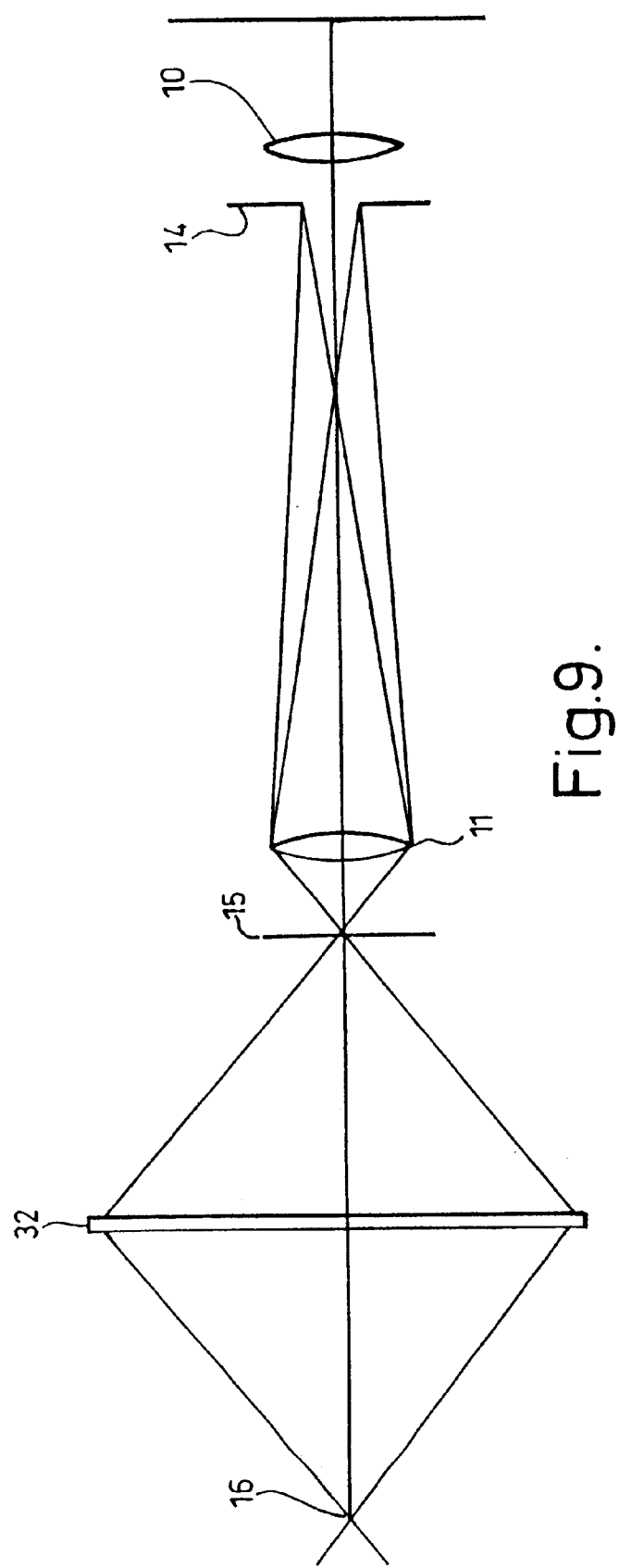
FIG. 9 shows the optical elements of a projection microscope utilising a combined Fresnel lens system and diffractive array.

FIG. 9 is similar to FIG. 7 and illustrates a projection microscope but a single optical element 32 performs the functions of the field lens system 12, 13 (FIG. 7) and of the diffractive element 25 (FIG. 7) to generate an array of a plurality of exit pupils. Such an element is of less weight and may be manufactured economically.

It is preferred to form the first and second cylindrical Fresnel lenses in a common surface of a substrate but if desired the first and second cylindrical Fresnel lenses may be formed on different surfaces which in the microscope extend parallel to one another. For example, one lens pattern may be formed on one surface of a substrate and the other lens pattern may be formed on an opposite surface of the substrate.

It is envisaged that usually the diffractive element would remain stationary relative to the other optical elements of the optical instrument. However in some instances it may be desirable to move the diffractive element relative to the other optical elements of the optical instrument for example by rotation of the diffractive element about an axis perpendicular to the plane of the element, or in the case of a concave part-spherical element, about a central axis of the element. Such rotation may be effected by providing an electric motor and a drive transmission from the motor to the diffractive element.

Hereinbefore the invention has been described in relation to microscopes however it is to be understood that the invention is not limited to microscopes and may be utilised to produce enlarged exit pupils for other forms of optical instrument or apparatus.

As mentioned hereinbefore, the diffractive element 25 may be a separate element or may be formed integrally with another optical element such as a lens or mirror of the optical apparatus. When the diffractive element is formed integrally with another optical element such as a lens or mirror, the grooves and the lines comprising the diffractive grating are formed on a surface of the other optical element. This may conveniently be effected by depositing a layer of material on a surface of the optical element and then cut ting or otherwise forming the grooves in the deposited layer.

It is to be understood that where reference is made in the specification to a lens, mirror or other optical element such element may comprise a single optical element or a compound optical element consisting of a combination of elements.

I claim:
1. An optical instrument, comprising:
   an optical system for producing an optical image of an object, said optical image being viewable by an observer at in exit pupil; and
   a diffractive optical element for producing an array of a plurality of said exit pupils; wherein:
      said diffractive optical element includes a substrate bearing at least three optical diffraction gratings in a common plane; and
      each optical diffraction grating comprises a set of continuous, parallel diffraction grating lines defined by continuous grooves or edges in said substrate, with said diffraction grating lines of each optical diffraction grating extending in a different angular direction relative to said diffraction grating lines of each other of said optical diffraction gratings.

2. The optical instrument as claimed in claim 1, wherein walls of said grooves or edges defining said optical diffraction gratings have a profile effective to distribute light energy substantially uniformly to said exit pupils in said array of exit pupils.

3. The optical instrument as claimed in claim 1, wherein said diffractive optical element is integral with cylindrical Fresnel lenses.

4. The optical instrument as claimed in claim 1, wherein said optical instrument is a microscope.

5. An optical instrument, comprising:
   an optical system for producing an optical image of an object, said optical image being viewable by an observer at an exit pupil; and
   a diffractive optical element for producing an array of a plurality of said exit pupils; wherein:
      said diffractive optical element includes a substrate bearing in a common plane at least first, second and third optical diffraction gratings;
      said first optical diffraction grating comprises a first set of continuous, parallel first diffraction grating lines defined by continuous first grooves or edges in said substrate;
      said second optical diffraction grating comprises a second set of continuous, parallel second diffraction grating lines defined by continuous second grooves or edges in said substrate;
      said third optical diffraction grating comprises a third set of continuous, parallel third diffraction grating lines defined by continuous third grooves or edges in said substrate;
      said first, second and third sets of diffraction grating lines extend in different angular directions relative to one another; and said common plane of said diffractive optical element is located at a focal or image plane of said optical system.

6. The optical instrument as claimed in claim 5, wherein said common plane extends on a surface of said substrate.

7. The optical instrument as claimed in claim 5, wherein said common plane is of curved form.

8. The optical instrument as claimed in claim 5, wherein said diffraction grating lines of each optical diffraction grating are disposed symmetrically relative to each other.

9. The optical instrument as claimed in claim 5, wherein said diffraction grating lines of each optical diffraction grating are disposed equi-angularly relative to one another.

10. The optical instrument as claimed in claim 5, wherein said optical diffraction gratings are effective to produce said exit pupils of said array of exit pupils in overlapping relationship.

11. The optical instrument as claimed in claim 5, wherein said diffractive optical element is formed on or integral with a surface of another optical element.

12. The optical instrument as claimed in claim 5, wherein:
   said optical system comprises an objective lens for producing an image of said object, and an eyepiece lens for producing a magnified image of said image viewable at said exit pupil; and
   said first, second and third optical diffraction gratings of said diffractive optical element are located in said image plane for producing said array of said exit pupils so located relative to one another as to be perceivable by an eye of said observer as an effective single, continuous enlarged exit pupil.

13. The optical instrument as claimed in claim 5, wherein said optical instrument is a microscope.

14. An optical instrument comprising:
   a first, objective lens; a second, eyepiece lens for producing an aperture image of an aperture of said objective lens viewable at a first exit pupil; and
   an optical system for receiving an optical image of said image produced by said objective and eyepiece lenses at an image plane, and relaying said aperture image to a second exit pupil, said optical image being viewable by an observer at said second exit pupil; wherein:
      said optical system includes a diffractive optical element for producing an array of a plurality of said second exit pupils;
      said diffractive optical element includes a substrate bearing at least three optical diffraction gratings, each optical diffraction grating being commonly disposed in said image plane; and
      each optical diffraction grating comprises a set of continuous, parallel diffraction grating lines defined by continuous grooves or edges in said substrate, with said diffraction grating lines of each optical diffraction grating extending in a different angular direction relative to said diffraction grating lines of each other of said optical diffraction gratings.

15. The optical instrument as claimed in claim 14, wherein said diffractive optical element is integral with a surface of one element of said optical system.

16. The optical instrument as claimed in claim 14, wherein said optical instrument is a microscope.

17. A microscope comprising:
   an optical system for producing an optical image of an object, said optical image being viewable by an observer at an exit pupil; and
   a diffractive optical element for producing an array of a plurality of said exit pupils; wherein:
      said diffractive optical element includes a substrate bearing at least three optical diffraction gratings in a common plane; and
      each optical diffraction grating comprises a set of continuous, parallel diffraction grating lines defined by continuous grooves or edges in said substrate, with said diffraction grating lines of each optical diffraction grating extending in a different angular direction relative to said diffraction grating lines of each other of said optical diffraction gratings.

18. A microscope as claimed in claim 17, wherein said microscope further comprises an objective lens and an eyepiece.

19. A diffractive optical element for producing an array of a plurality of exit pupils from an optical image, including:
   a substrate;
   a surface on said substrate; and
   at least three optical diffraction gratings in a common plane in said surface of said substrate;
   each optical diffraction grating comprising a set of continuous, parallel diffraction grating lines defined by continuous grooves or edges in said surface, with said diffraction grating lines of each optical diffraction grating extending in a different angular direction relative to said diffraction grating lines of each other of said optical diffraction gratings.

20. A diffractive optical element for producing an array of a plurality of exit pupils from an optical image, including:
   a substrate bearing at least first, second and third optical diffraction gratings in a common plane;
   said first optical diffraction grating comprising a first set of continuous, parallel first diffraction grating lines defined by continuous first grooves or edges in said substrate;
   said second optical diffraction grating comprising a second set of continuous, parallel second diffraction grating lines defined by continuous second grooves or edges in said substrate;
   said third optical diffraction grating comprising a third set of continuous, parallel third diffraction grating lines defined by continuous third grooves or edges in said substrate; and
   said first, second and third sets of diffraction grating lines extending in a different angular direction relative to one another.

21. The diffractive element as claimed in claim 20, wherein said substrate is optically transmissive.

22. The diffractive element as claimed in claim 20, wherein said substrate is optically reflective.

23. The diffractive element as claimed in claim 20, wherein said substrate is a cylindrical Fresnel lens.

* * * * *

UNITED STATES PATENT AND TRADEMARK OFFICE
CERTIFICATE OF CORRECTION

PATENT NO. : 6,608,720 B1 Page 1 of 1
DATED : August 19, 2003
INVENTOR(S) : Freeman It is certified that error appears in the above-identified patent and that said Letters Patent is hereby corrected as shown below:

Column 8,
Line 9, change "microscope" to -- optical system --
Line 10, change "eyepiece" to -- eyepiece lens for producing an aperture image of an aperture of said objective lens. --

Signed and Sealed this

Sixteenth Day of December, 2003

JAMES E. ROGAN
*Director of the United States Patent and Trademark Office*